March 13, 1928.
P. C. OSCANYAN
1,662,125
CAMERA FOCUSING DEVICE
Filed June 9, 1926
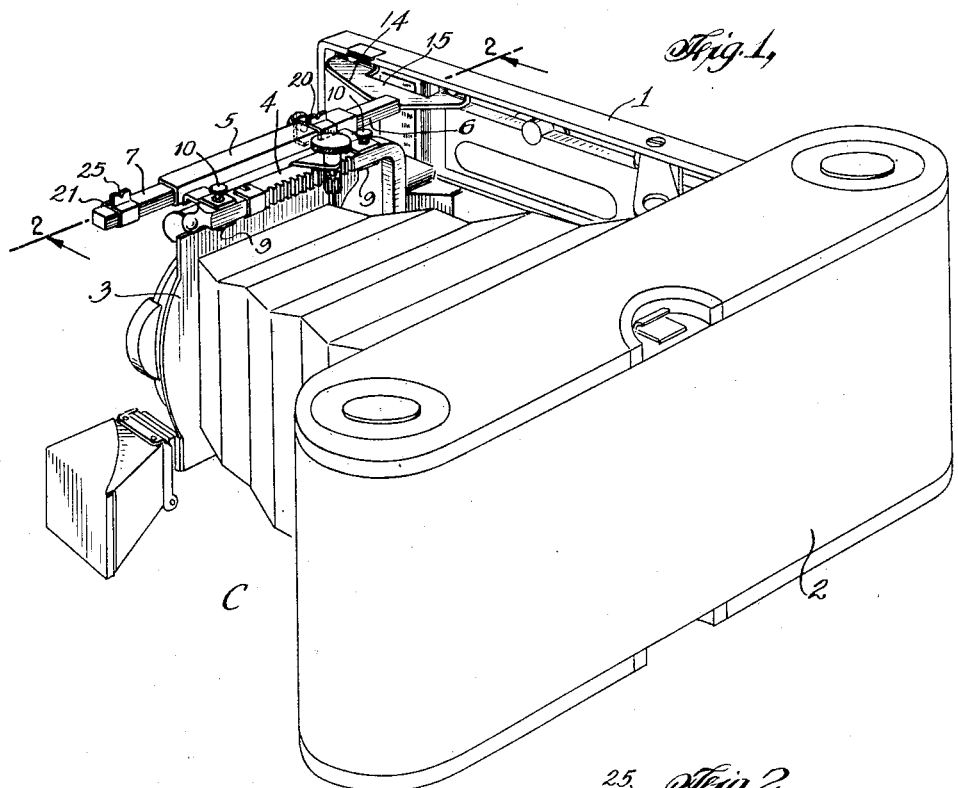
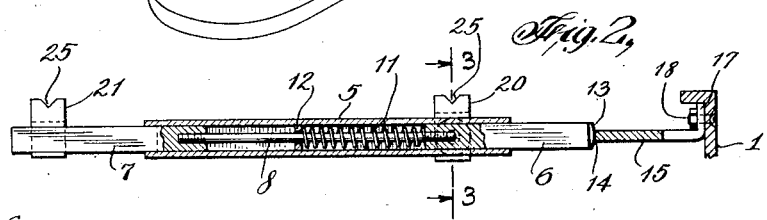
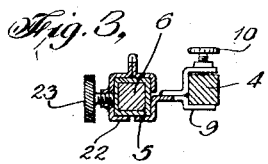 
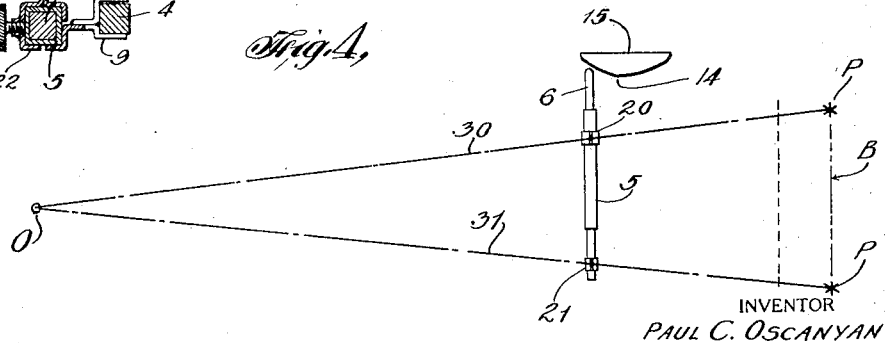
INVENTOR
PAUL C. OSCANYAN
BY
ATTORNEY Patented Mar. 13, 1928.

1,662,125

UNITED STATES PATENT OFFICE.

PAUL C. OSCANYAN, OF BOGOTA, NEW JERSEY.

CAMERA FOCUSING DEVICE.

Application filed June 9, 1926. Serial No. 114,709.

My invention relates to camera focusing devices, or more particularly described, range finding devices suitable for cameras and incorporated in or applied to the camera in such a way that when the focusing device or range finder is properly positioned, as indicated by converging lines of sight, by moving the lens carrier to and fro, the lens carrier is in proper focal position with reference to the sighted object.

An important object is to provide a device in the operation of which both eyes of the operator are used to establish convergent sight lines indicated by the sight forming parts of the device, and to provide means by which, when these sight lines converge upon the selected object, the camera is in proper focus for the object.

Another object is to provide a simple and relatively inexpensive device of this class, which may be incorporated in a camera with little increase in the cost of the same, or may be made and sold separately at a moderate price, ready for easy attachment to the camera.

Another object is to adapt the device for ready application to cameras of the folding type without any, or any considerable, modification of the camera, and in such a way that the focusing attachment does not interfere with opening and closing the camera in the normal way.

The characteristics and advantages of the invention are further sufficiently explained in connection with the following detail description of the accompanying drawing, which shows one representative embodiment of the invention. After considering this example, skilled persons will understand that many variations may be made, and I contemplate the employment of any structures that are properly within the scope of the appended claims.

In the drawings:

Fig. 1 is a perspective view of a camera of the folding type with focusing or range finding mechanism applied thereto, this mechanism being one representative embodiment of the invention.

Fig. 2 is a section at 2—2, Fig. 1.

Fig. 3 is a section at 3—3, Fig. 2.

Fig. 4 is a diagram in plan, explaining the operation and optical principle of the device.

Fig. 1 shows a typical folding camera C including the hinged bed 1 which, when closed, forms one cover of the box 2, and lens carrier 3 arranged in this example for vertical adjustment on the uprights 4, which are provided with a base running on ways on the bed 1, so that when the bed is opened and secured in position, as shown, the lens carrier is run out and held by frictional or positive clamping devices, ready for focusing.

In the specific embodiment of the invention illustrated, one of the uprights or posts 4 has applied to it a sleeve 5 in which bars 6 and 7, connected by a rod 8, are arranged to reciprocate as a unit. The sleeve may be permanently connected to post 4 or other suitable part of the lens carrier, and in that case the focusing device forms a permanent or integral part of the camera structure; otherwise, as shown, the sleeve may be provided with jaws or clips 9 to fit post 4, with set screws 10 to engage the post and retain the sleeve and other parts firmly but detachably in position, and in that case the device may be sold as an attachment, readily applicable to any standard camera, modifications being made, of course, in the device itself and in the attachment means whenever necessary to adapt it to cameras of different characteristics from the one shown.

The sleeve 5 and bars 6 and 7 are conveniently made of square section but they may be of other polygonal forms or round, and in the latter case rotation of the bars will be prevented in any ordinary way, as by the provision of a spline or pin in one or both of the bars engaging a groove or slot in the sleeve.

The connected bars 6 and 7 are normally urged toward the bed 1 by a spring 11 placed about rod 8 between the inner end of bar 6 and an internal shoulder 12 in the sleeve. The rounded end 13 of bar 6, throughout the range or focusing movement of the lens carrier, rests on the edge 14 of a cam 15 secured to the bed, the edge 14, as sufficiently indicated in Fig. 1 being contoured in accordance with focal characteristics of the particular lens or camera, this contour being determinable by calculation or empirically by focusing and plotting. The cam is provided with angularly bent lugs 17 secured to bed 1 by small screws and nuts 18, but any other known or suitable means may be provided for easily and quickly securing the cam to the camera bed.

Sights 20 and 21 are provided, of which 20 is located on sleeve 5, and 21 on the outward end of bar 7. One sight, as 21, may be permanently secured, but the other, as 20, is preferably adjustably secured by means of jaws or a bracket 22, Fig. 3, slidably fitting sleeve 5, and provided with a set screw 23 to lock it in adjusted position, this adjustment being to properly set the focusing device with regard to "pupilary distance"—distance between eye pupils of the user. Each sight is provided with a notch 25 to indicate the sight line, or other suitable sight directing means or formations may be employed.

Fig. 4 sufficiently explains the operation. When the camera bed is opened and the lens carrier 3 pulled out to extend the bellows, the end 13 of bar 6 is brought upon the guide edge 14 of cam 15 and remains on that edge throughout the focusing range, being yieldably held in such contact by spring 11. Therefore the connected bars 6 and 7 and sight 21 are positioned in accordance with movement of the lens carrier, this positioning being with relation to the relatively fixed sight 20 and being suited to the focal characteristics of the lens or camera. The camera is now held in the hands or placed on a fixed support in the position of Fig. 1, that is, with one side up, and the observer positions his head behind the box 2, the positions of the eye pupils P being indicated in Fig. 4. The camera is directed toward an object O at a known distance, and the camera is properly focused for that object, usually by moving the lens carrier 3 until the pointer thereon agrees with the proper distance mark on a scale on the bed, or if the distance of the object selected for the initial adjustment of the focusing device is not known, the camera may be focused by observation of the image on the ground glass if such a glass is provided. The camera being properly focused for the object O, the operator sights, with one eye at a time, through the notches 25 of the respective sights 20 and 21 and moves sight 20 on sleeve 5 until the convergent sight lines 30, 31, meet upon the object or selected part thereof. The sights are now adjusted for the operator's pupilary distance and the adjustment is fixed by setting up set screw 23. Evidently if the camera is now pointed at another object at a different distance, the sight lines meet upon that object and the lens carrier is moved until the movement of sight 21, controlled by cam 15, so positions sight 21 that the sight lines meet upon the selected object and the camera is thereupon focused for the object.

An important and valuable feature of the invention is that advantage is taken of the bi-optic organization of man in providing two relatively movable sights controlled as above described, to provide a very simple and inexpensive device which gives very accurate focusing indications and dispenses with more or less complicated and inaccurate devices heretofore proposed, most or all of which depend in operation upon a single sight line or the use of only one eye. Another important characteristic is the fact that the percentage of accuracy or what may be called the inherent accuracy of the device increases in proportion to the proximity of the object. This is easily understood in Fig. 4 where it will be observed that if the object O is closer to the camera, the angle of the sight lines at the object increases. In brief, the sight lines converge more sharply as the camera is brought nearer to the object and therefore the sighting operation is more accurate without particular effort, for near objects, and the focus will be very accurately made, while for distant objects, within the range of so-called "universal focus" the per cent of accuracy decreases, but accurate focusing in this range is relatively unimportant, as readily understood by opticians, without further explanation.

I claim:

1. Focusing mechanism applicable to a camera and comprising relatively movable sights on a common axis, and means for varying the sight positions in accordance with movement of a camera part in focusing so that proper focus is established by coincidence of convergent direct sight lines from the eyes of an operator through the sights upon the object, the sight axis being located between the object and the observer and parallel to the plane of the observer's eyes and relatively near the latter.

2. In a camera, focusing mechanism comprising a straight sight supporting axis, relatively movable sights thereon, and means for varying the sight positions in accordance with movement of a camera part in focusing so that proper focus is established by coincidence of convergent direct sight lines from the eyes of an operator through the sights upon the object, the sight axis being located between the object and the observer and parallel to the plane of the observer's eyes and relatively near the latter.

3. The combination with a camera of focusing mechanism comprising a straight sight support located upon the camera in a position transverse the lens axis thereof, relatively movable sights on said support, and means for varying the sight positions in accordance with movement of a camera part in focusing so that proper focus is established by coincidence of simultaneous convergent direct sight lines from the eyes of an operator through the sights upon the object.

4. Focusing mechanism applicable to a camera and comprising relatively movable sights attachable to a camera part which is moved in focusing, and a cam arranged for mounting on a relatively fixed part, the cam being contoured in accordance with focal characteristics of the lens or camera, and acting to relatively position the sights in accordance with movement of said movable camera part.

5. Focusing mechanism devised for cooperation with camera parts as stated hereafter, comprising relatively movable sights carried by a camera part which is moved in focusing, and a cam contoured in accordance with focal characteristics of the camera or lens and devised for mounting on a relatively fixed part of the camera, the cam then acting to relatively position the sights in accordance with movement of said movable camera part, the sights being positioned to define convergent sight lines from eyes of the user positioned behind the camera at a base line substantially parallel to the line of sight adjustment, correct focal position being determined by coincidence of said sight lines upon the object.

6. A focusing device or range finder for cameras or for similar purposes, comprising a support adapted for connection to a part of a camera which is movable for focusing, a sight adjustable thereon in accordance with pupilary distance, a sight movably mounted on the support, and a cam on a relatively fixed part of the camera and cooperating with the movable sight to position it in accordance with the positioning of said movable camera part.

7. A range finder for cameras and for similar purposes comprising a sight support, sights relatively movable thereon in a direction substantially parallel with a base defined by the eye pupils of an operator positioned behind the camera, and means for relatively moving the sights convergently in focusing upon near objects and divergently in focusing upon far objects.

8. Range finding mechanism for cameras and for similar purposes comprising a sight normally fixedly mounted on a part of a camera which is moved in focusing, and another sight mounted on said camera part both sights being in a plane perpendicular to the camera lens axis, the last named sight being movable in relation to the sight first mentioned, and means for automatically moving the movable sight upon movement of said camera part in focusing.

9. Range finding mechanism for cameras and for similar purposes comprising a sight adjustable in accordance with pupilary distance upon a part of a camera which is moved in focusing, said sight being normally fixed after adjustment, a relatively movable sight also mounted on said camera part, and means for automatically positioning the last-named sight in accordance with the focused position of said movable camera part.

10. Focusing mechanism adapted for combination with a camera of the folding type and comprising relatively movable sights arranged for mounting on a part of the camera which is extended from the box and movable in focusing, and serving to indicate focal position by varying convergence of sight lines from the eyes of the user through the sights upon the object, and means adapted to co-operate with the sights to relatively position them as said movable camera part is moved throughout focusing range.

11. Focusing mechanism adapted for combination with a camera of the folding type and comprising relatively movable sights arranged for mounting on a part of the camera which is extended from the box and movable in focusing, and serving to indicate focal position by varying convergence of sight lines from the eyes of the user through the sights upon the object, and means adapted to co-operate with the sights to relatively position them as said movable camera part is moved throughout focusing range, said sights and said means being arranged to admit folding of the camera and also to be brought into operative relation upon the opening of the camera and movement of said movable camera part to a focusing position.

12. A range finder or focusing mechanism adapted for combination with a folding camera including a box and a lens carrier arranged for extension from the box to focusing position, said range finder comprising relatively movable sights adapted for connection to said lens carrier, and co-operating means for relatively positioning the sights in accordance with the focusing movement of said lens carrier to indicate focus by convergence of sight lines through the sights upon the object, said sights and said co-operating means being arranged to be enclosed in the box when the camera is folded.

13. The combination of a camera and a range finder thereon, said range finder including a normally fixed sight for one eye and a distance gauging sight for the other eye, the sights being arranged on a common axis and adapted for simultaneous direct observation of an object by both eyes of the user.

14. The combination of a camera and a direct vision range finder thereon, said range finder including a sight support having an axis located in a plane substantially perpendicular to the camera lens, and a plurality of sights located on said support and in said support axis and adapted for direct bi-optic observation of an object and determination of the distance thereof.

15. The combination with a camera of a range finder including a plurality of sights arranged for relative adjustment and for simultaneously directing vision from both eyes of the user convergently upon an object, the sights being also relatively adjustable initially to agree with pupilary distance of the user's eyes.

16. In combination with a camera, a range finder including a sight base having a sight axis arranged substantially parallel to the eyes of the user, and sights thereon located on said axis and arranged to determine distance of an object by directing simultaneous convergent sight lines from the eyes upon the object.

17. A bi-optic range finder comprising a sight base, a plurality of sights thereon, and means for adjusting the sights to the pupillary distance of the user.

Signed at New York city, in the county of New York and State of New York this 7th day of June, A. D. 1926.

PAUL C. OSCANYAN.